US012657326B2

(12) United States Patent
Nishiura

(10) Patent No.: US 12,657,326 B2
(45) Date of Patent: Jun. 16, 2026

(54) AUTHENTICATION SYSTEM, AUTHENTICATION METHOD, AND RECORDING MEDIUM HAVING AUTHENTICATION PROGRAM RECORDED THEREON

(71) Applicant: SHARP KABUSHIKI KAISHA, Sakai City (JP)

(72) Inventor: Kazuo Nishiura, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 107 days.

(21) Appl. No.: 18/752,836

(22) Filed: Jun. 25, 2024

(65) Prior Publication Data

US 2025/0021683 A1     Jan. 16, 2025

(30) Foreign Application Priority Data

Jul. 10, 2023     (JP) ................................. 2023-113170

(51) Int. Cl.
| *G06F 21/62* | (2013.01) |
| *G06F 21/31* | (2013.01) |
| *H04L 9/32* | (2006.01) |
| *H04L 9/40* | (2022.01) |

(52) U.S. Cl.
CPC ........ *G06F 21/6218* (2013.01); *H04L 9/3228* (2013.01); *G06F 21/31* (2013.01); *G06F 2221/2141* (2013.01); *H04L 63/083* (2013.01)

(58) Field of Classification Search
CPC ................. G06F 21/6218; G06F 21/31; G06F 2221/2141; H04L 9/3228; H04L 63/083
See application file for complete search history.

(56) References Cited

U.S. PATENT DOCUMENTS

| 2001/0028363 A1* | 10/2001 | Nomoto .................. G06F 16/10 715/205 |
| 2006/0227378 A1* | 10/2006 | Mihira ................ G06F 21/6218 358/402 |
| 2007/0233687 A1* | 10/2007 | Iwase ..................... G06F 21/608 707/999.009 |
| 2009/0024931 A1* | 1/2009 | Bae ...................... G06F 21/6218 715/748 |
| 2010/0231950 A1* | 9/2010 | Sawayanagi .......... G06F 3/1286 358/1.14 |
| 2014/0109241 A1* | 4/2014 | Huang ................ G06F 21/6218 726/28 |
| 2016/0234345 A1* | 8/2016 | Roberts, Jr. ........... H04L 67/306 |
| 2017/0048315 A1* | 2/2017 | Subramani .......... H04L 67/1095 |
| 2020/0128149 A1* | 4/2020 | Sasaki ................ H04N 1/00209 |

FOREIGN PATENT DOCUMENTS

| CN | 113934700 A | * | 1/2022 | ............. G06F 21/46 |
| JP | 2008-171087 A | | 7/2008 | |

* cited by examiner

*Primary Examiner* — Robert B Leung
(74) *Attorney, Agent, or Firm* — ScienBiziP, P.C.

(57) ABSTRACT

A signage system includes: a setting processing unit that, when access information for accessing the access target data is selected by a user, sets password information necessary to access the access target data to a predetermined operation folder associated with the access information in advance; a transmission processing unit that transmits an access request including the password information based on the access information; and an authentication processing unit that authenticates the access to the access target data based on the password information included in the access request.

8 Claims, 7 Drawing Sheets

D1

| OPERATION FOLDER ID | ACCESS INFORMATION | PASSWORD |
|---|---|---|
| F001 | http://server/folder/d1 | pass1 |
| F002 | http://server/folder/d2 | – |
| F003 | http://server/folder/d3 | – |
| ... | ... | ... |

FIG. 2 d1

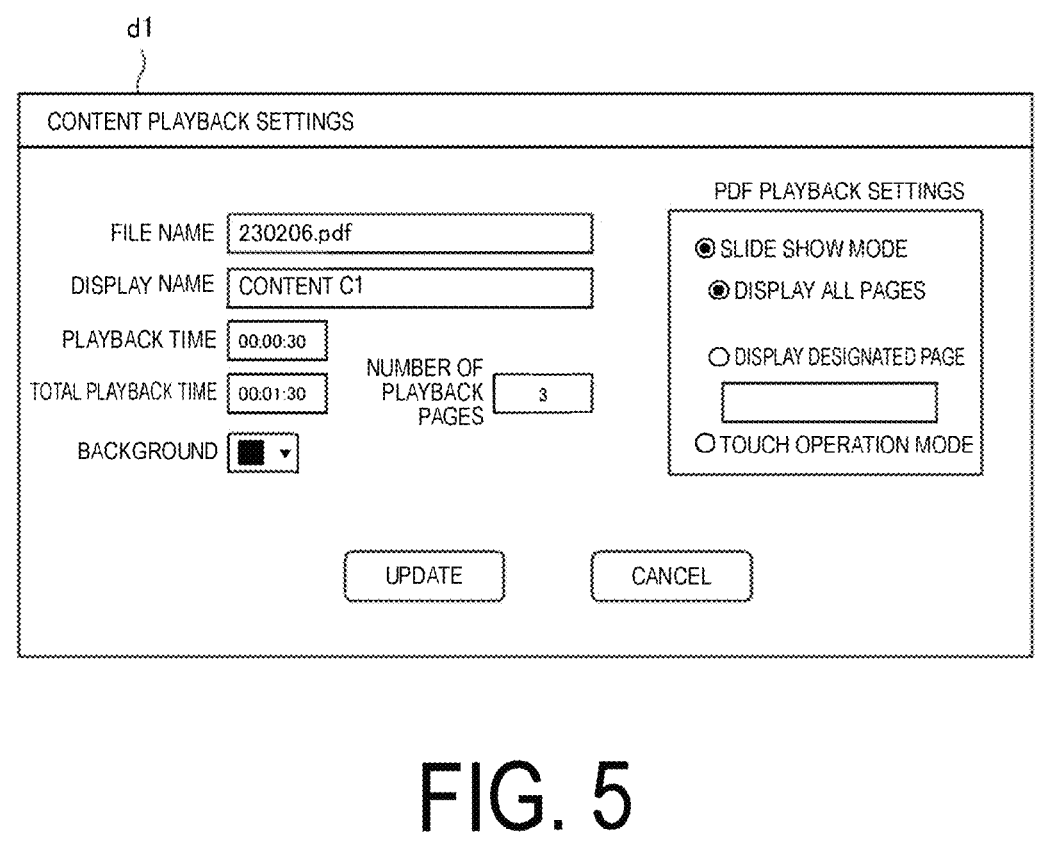

CONTENT PLAYBACK SETTINGS

PDF PLAYBACK SETTINGS

FILE NAME | 230206.pdf

DISPLAY NAME | CONTENT C1

PLAYBACK TIME | 00:00:30

TOTAL PLAYBACK TIME | 00:01:30

NUMBER OF PLAYBACK PAGES | 3

BACKGROUND | ■ ▼

⦿ SLIDE SHOW MODE

⦿ DISPLAY ALL PAGES

○ DISPLAY DESIGNATED PAGE

○ TOUCH OPERATION MODE

UPDATE          CANCEL

FIG. 5

AUTHENTICATION SYSTEM, AUTHENTICATION METHOD, AND RECORDING MEDIUM HAVING AUTHENTICATION PROGRAM RECORDED THEREON

INCORPORATION BY REFERENCE

This application is based upon and claims the benefit of priority from the corresponding Japanese Patent Application No. 2023-113170 filed on Jul. 10, 2023, the entire contents of which are incorporated herein by reference.

BACKGROUND

The present disclosure relates to a technique of authenticating an access to access target data.

In the known system, authentication to access a server via a network is performed. For example, the system inputs login information for a user to access the server, and authenticates the access to the server when the login information is correct.

However, according to the related art, the user needs to input login information every time the user accesses the server (access target data), and therefore takes time and effort. For example, a method of issuing a URL to the user in advance may be considered, the URL (access information) being for accessing the server to omit the input operation of the login information. However, this method has a problem in that, when, for example, the URL is leaked to a third party, the third party may make an unauthorized access to the server.

SUMMARY

An object of the present disclosure is to provide an authentication system that can improve operability of an access to access target data and prevent an unauthorized access, an authentication method, and a recording medium having an authentication program recorded thereon.

An authentication system according to one aspect of the present disclosure is a system that authenticates an access to access target data. The authentication system includes a setting processing unit, a transmission processing unit, and an authentication processing unit. When access information for accessing the access target data is selected by a user, the setting processing unit sets password information necessary to access the access target data to a predetermined operation folder associated with the access information in advance. The transmission processing unit transmits an access request including the password information based on the access information. The authentication processing unit authenticates the access to the access target data based on the password information included in the access request.

An authentication method according to another aspect of the present disclosure is a method of authenticating an access to access target data. The authentication method includes at one or more processors: when access information for accessing the access target data is selected by a user, setting password information necessary to access the access target data to a predetermined operation folder associated with the access information in advance; transmitting an access request including the password information based on the access information; and authenticating the access to the access target data based on the password information included in the access request.

A recording medium according to still another aspect of the present disclosure is a recording medium having recorded thereon a program of authenticating an access to access target data. The authentication program is a program for causing one or more processors to execute: when access information for accessing the access target data is selected by a user, setting password information necessary to access the access target data to a predetermined operation folder associated with the access information in advance; transmitting an access request including the password information based on the access information; and authenticating the access to the access target data based on the password information included in the access request.

According to the present disclosure, it is possible to provide an authentication system that can improve operability of an access to access target data and prevent an unauthorized access, an authentication method, and a recording medium having an authentication program recorded thereon.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a diagram illustrating an example of authentication information according to the embodiment of the present disclosure.

FIG. 5 is a diagram illustrating an example of an operation screen of content playback settings according to the embodiment of the present disclosure.

DETAILED DESCRIPTION

Hereinafter, embodiments of the present disclosure will be described below with reference to the accompanying drawings. Note that the following embodiments are examples of the embodied present disclosure, and do not limit the technical scope of the present disclosure.

An authentication system according to the present disclosure is a system that authenticates an access to access target data. More specifically, the authentication system accesses the access target data stored in the server from a user terminal, and executes authentication processing of permitting or rejecting a user operation on the access target data.

The authentication system according to the present disclosure is applicable to various systems that authenticate an access to access target data. The present embodiment will cite as an example an example where the authentication system is applied to a signage system (content playback system) that plays back content.

The signage system is a system that causes a display device (digital signage display) installed at a predetermined place to play back a plurality of items of content according to a predetermined playback schedule (playlist). For example, the signage system displays (plays back) content including a video and an audio of, for example, an advertisement at various places such as public squares, stations, streets, business offices, and stores. The authentication system according to the present disclosure is included in the signage system. In the signage system, the access target data is data stored in a server, and is, for example, data such as a playlist of content and setting information related to playback settings.

Figure 1:
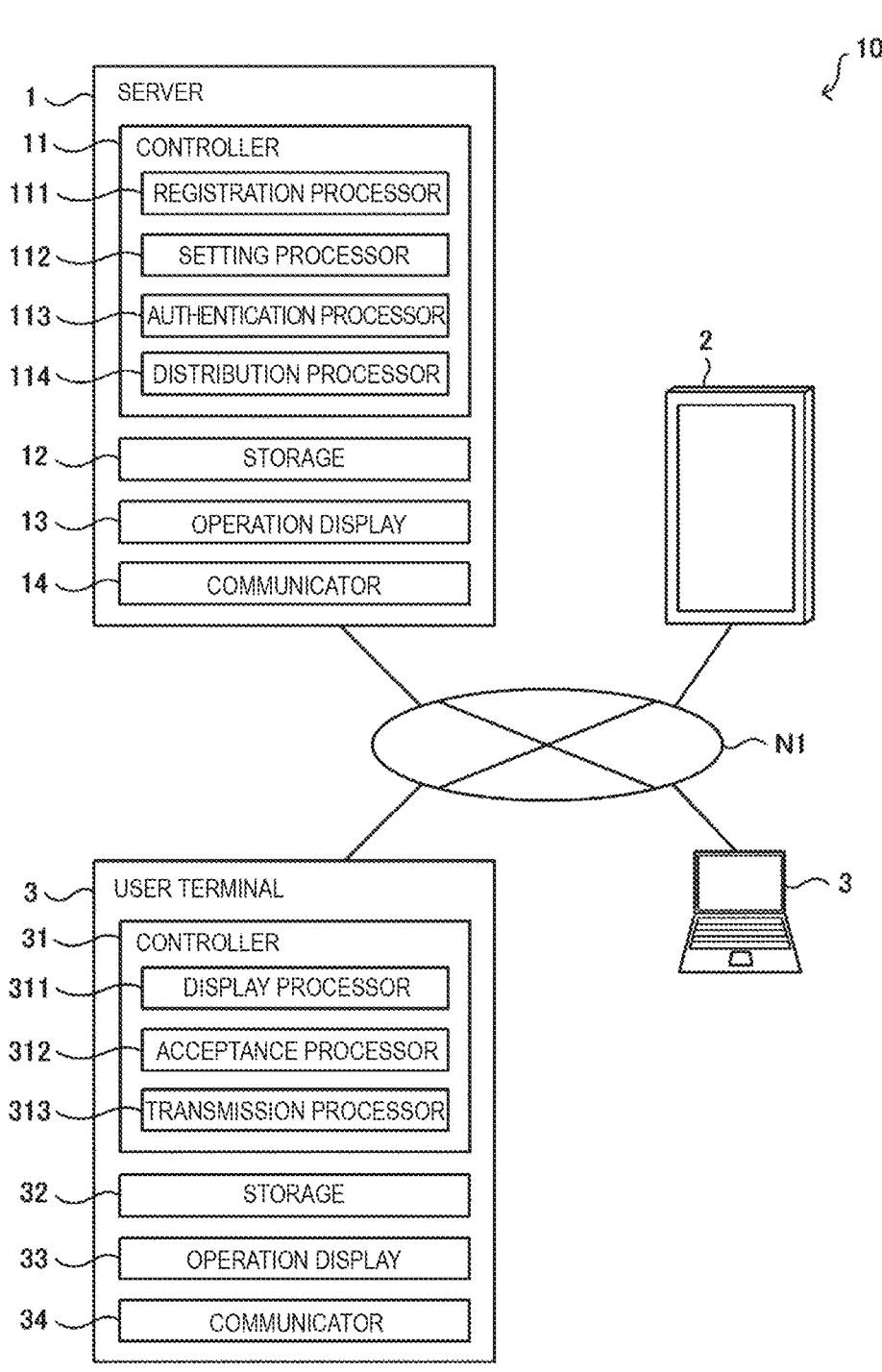
FIG. 1 is a functional block diagram illustrating a schematic configuration of a signage system according to an embodiment of the present disclosure.

FIG. 1 is a diagram illustrating a schematic configuration of a signage system 10 according to the present embodiment. The signage system 10 includes a server 1, a display device 2, and a user terminal 3. The server 1, the display device 2, and the user terminal 3 are communicably connected via a network N1. The network N1 is, for example, a communication network such as the Internet.

Furthermore, the signage system 10 may include a plurality of the display devices 2 and a plurality of the user terminals 3. The server 1 manages the plurality of display devices 2 each of which is installed at a different place. The user terminal 3 is an operation terminal for registering content to be played back by the display device 2, and setting various items related to playback of the content.

[Server 1]

As illustrated in FIG. 1, the server 1 is a server computer that includes a controller 11, a storage 12, an operation display 13, and a communicator 14. Note that the server 1 is not limited to one computer, and may be a computer system in which a plurality of computers operate in cooperation with each other. Furthermore, various processing executed by the server 1 may be executed in a distributed manner by one or more processors.

The communicator 14 is a communication interface for connecting the server 1 to the network N1 by wire or wirelessly, and executing data communication with the display device 2 and the user terminal 3 via the network N1 according to a predetermined communication protocol.

The operation display 13 is a user interface that includes a display such as a liquid crystal display or an organic EL display that displays various information, and an operation inputter such as a mouse, a keyboard, or a touch panel that accepts an operation. The operation display 13 accepts, for example, an operation of an administrator of the server 1.

The storage 12 is a non-volatile storage such as a Hard Disk Drive (HDD), a Solid State Drive (SSD), or a flash memory that stores various information. The storage 12 stores a control program such as an authentication program for causing the controller 11 to execute authentication processing (see FIG. 6) described below. For example, the authentication program is non-temporarily recorded in a computer-readable recording medium such as a CD or a DVD, read by a reading device (not illustrated) such as a CD drive or a DVD drive included in the server 1, and stored in the storage 12. Note that the authentication program may be distributed from a cloud server and stored in the storage 12.

Furthermore, the storage 12 stores various information related to content in addition to the content data. More specifically, the storage 12 stores data such as a playlist related to a playback schedule of content and setting information of various items related to playback of the content.

Furthermore, the storage 12 also stores authentication information D1 for authenticating an access to the access target data. FIG. 2 illustrates an example of the authentication information D1. The authentication information D1 is stored in association with information such as an operation folder ID, access information, and a password. The operation folder ID is identification information of an accessible operation folder in the user terminal 3. For example, the operation folder is a shared folder that can be operated by a plurality of users having an operation privilege. For example, a plurality of users belonging to the same group can access a common operation folder (shared folder) via the network N1 using the respective user terminals 3.

The access information is information for accessing the access target data via the network N1, and is information indicating a storage location of the access target data. For example, the access information is a Uniform Resource Locator (URL). The controller 11 generates and registers the access information for each operation folder.

The password is information for authenticating an access to the access target data. The controller 11 sets and registers the password for each operation folder. FIG. 2 illustrates a state where a password "pass1" is set to an operation folder ID "F001" (operation folder F1). No password is set to the operation folder IDs "F002" and "F003".

Note that, as another embodiment, part or all of the content data, the playlist, the setting information, and the authentication information D1 may be stored in another server (data server) that is accessible from the server 1. In this case, the controller 11 of the server 1 may acquire the information from the another server and execute each processing.

The controller 11 includes controlled devices such as a CPU, a ROM, and a RAM. The CPU is a processor that executes various types of arithmetic processing. The ROM is a non-volatile storage in which control programs such as a BIOS and an OS for causing the CPU to execute various types of processing are stored in advance. The RAM is a volatile or non-volatile storage that stores various types of information, and is used as a temporary storage memory (work area) for various types of processing executed by the CPU. Furthermore, the controller 11 controls the server 1 by causing the CPU to execute various control programs stored in advance in the ROM or the storage 12.

More specifically, the controller 11 includes various processing units such as a registration processing unit 111, a setting processing unit 112, an authentication processing unit 113, and a distribution processing unit 114. Note that the controller 11 functions as the various processing units by executing various types of processing according to the control program. Note that part or all of the processing units included in the controller 11 may be configured as electronic circuits. Note that the control program may be a program for causing a plurality of processors to function as the various processing units.

Figure 3:
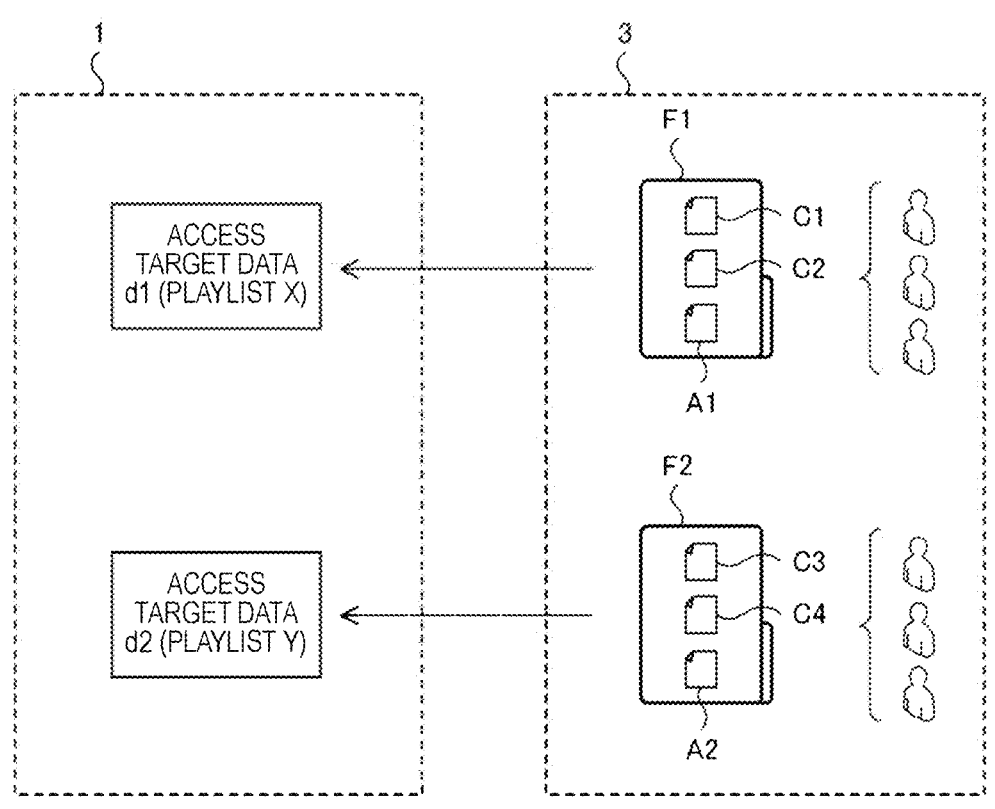
FIG. 3 is a diagram illustrating an example of processing of a server and a user terminal according to the embodiment of the present disclosure.

The registration processing unit 111 registers playback target content. More specifically, when receiving, from a predetermined user, an operation of registering playback target content in the operation folder, the registration processing unit 111 registers the content in the operation folder. FIG. 3 illustrates operation folders F1 and F2 that are accessible from the user terminal 3. For example, by activating a signage application (Web application) and executing browser processing, the user terminal 3 displays the operation folders F1 and F2 in the server 1. A plurality of users each having the operation privilege are registered to the operation folders F1 and F2.

For example, the user who has the operation privilege of the operation folder F1 opens the operation folder F1 in the user terminal 3, and performs an operation of registering items of playback target content C1 and C2 in the operation folder F1. The registration processing unit 111 registers the items of content C1 and C2 in a playlist X according to the user's operation. Similarly, the user having the operation privilege of the operation folder F2 opens the operation folder F2 on the user terminal 3, and performs an operation of registering the items of playback target content C3 and C4 in the operation folder F2. The registration processing unit 111 registers the items of content C3 and C4 in a playlist Y according to the user's operation.

As described above, each user can execute the Web application on the user terminal 3, access a predetermined operation folder for which each user has the operation privilege, and register the playback target content.

When the user selects access information for accessing the access target data, the setting processing unit 112 sets password information necessary to access the access target data to a predetermined operation folder associated with the access information in advance. The access information is information including a URL for accessing the access target data via the network N1.

More specifically, the setting processing unit 112 sets the access information to the operation folder. For example, the setting processing unit 112 registers in the authentication information D1 a URL for accessing access target data d1 in association with the operation folder F1 (see FIG. 2). Furthermore, the setting processing unit 112 generates an access file A1 (HTML file) including the URL for accessing the access target data d1, and writes the access file A1 in the operation folder F1 (see FIG. 3).

Similarly, the setting processing unit 112 registers in the authentication information D1 a URL for accessing access target data d2 in association with the operation folder F2 (see FIG. 2). Furthermore, the setting processing unit 112 generates an access file A2 (HTML file) including the URL for accessing the access target data d2, and writes the access file A2 in the operation folder F2 (see FIG. 3). As described above, the setting processing unit 112 sets a URL to each operation folder, and writes in the operation folder an access file (HTML file) including the URL.

Furthermore, when the user selects the access information (access file), the setting processing unit 112 sets a password to the operation folder. For example, when the user selects the access file A1 written in the operation folder F1, the setting processing unit 112 sets the password ("pass1") to the operation folder F1. The registration processing unit 111 registers in the authentication information D1 the operation folder ID ("F001") and the password ("pass1") of the operation folder F1 associated with each other (see FIG. 2).

Figure 4:
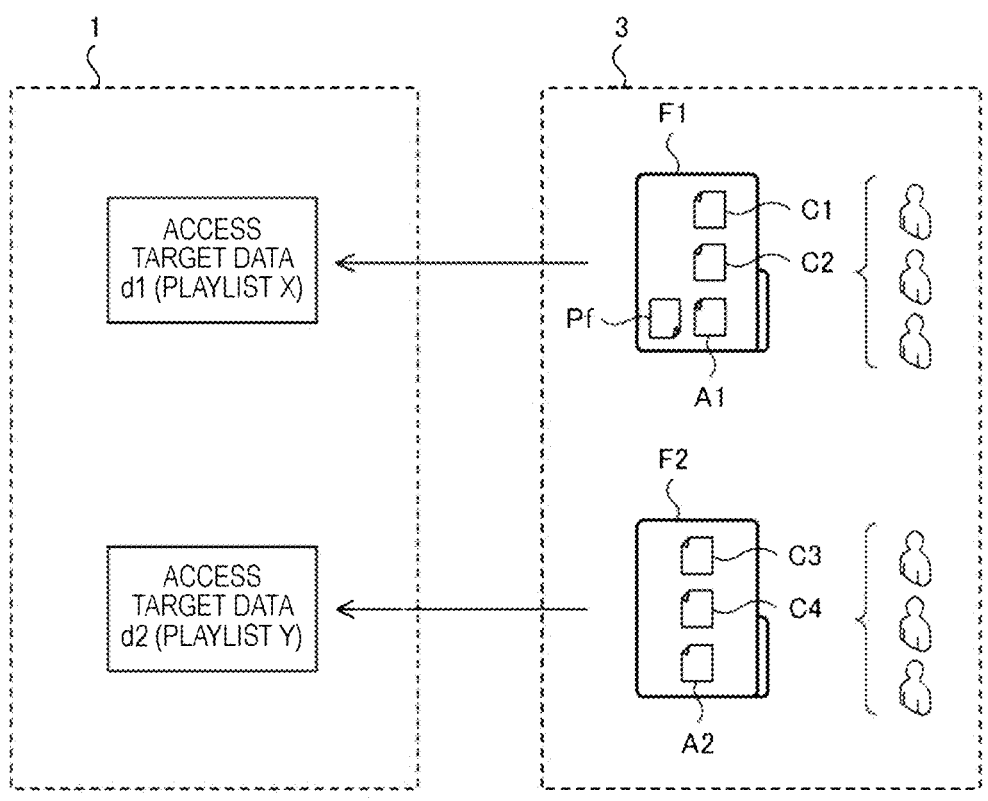
FIG. 4 is a diagram illustrating an example of processing of the server and the user terminal according to the embodiment of the present disclosure.

Furthermore, the setting processing unit 112 generates a password file Pf including the set password, and writes the password file Pf in the operation folder F1 corresponding to the user terminal 3 (see FIG. 4).

The authentication processing unit 113 authenticates an access to access target data based on password information included in an access request acquired from the user terminal 3. For example, when the user wants to access the access target data d1, the user selects the access file A1 in the operation folder F1 on the user terminal 3. When accepting an operation of selecting the access file A1, the user terminal 3 transmits the access request to the server 1. The authentication processing unit 113 acquires from the user terminal 3 the access request for the access target data d1. Here, the access request includes the password information. For example, when the user selects the access file A1 in the operation folder F1, the user terminal 3 reads the password from the password file Pf written in the operation folder F1, and transmits the password together with the access request to the server 1.

When the password information included in the access request matches with the password information registered in the storage 12 (authentication information D1), the authentication processing unit 113 authenticates the access to the access target data. For example, when the password included in the access request for the access target data d1 matches with the password ("pass1") associated with the operation folder F1 (see FIG. 2), the authentication processing unit 113 authenticates the access to the access target data d1.

Furthermore, when the password included in the access request for the access target data d1 does not match with the password ("pass1") associated with the operation folder F1, the authentication processing unit 113 rejects the access to the access target data d1.

When authenticating the access to the access target data, the authentication processing unit 113 permits the user having the operation privilege of the operation folder to perform a setting operation on the setting information. For example, when authenticating the access to the access target data d1, the authentication processing unit 113 permits the user having the operation privilege of the operation folder F1 to perform the setting operation related to content playback settings. FIG. 5 illustrates an example of an operation screen for playback settings of content corresponding to the access target data d1. When the access to the access target data d1 is authenticated, the user can perform various setting operations related to playback of the content corresponding to the access target data d1 on the user terminal 3. That is, by executing the Web application on the user terminal 3, the user can perform an operation of registering the content, and the setting operation related to playback of the content.

The distribution processing unit 114 distributes content to the display device 2. More specifically, the distribution processing unit 114 transmits display data including a playlist matching the display device 2, and content data to the display device 2. When acquiring the display data from the server 1, the display device 2 plays back the content based on the playlist.

[User Terminal 3]

As illustrated in FIG. 1, the user terminal 3 includes a controller 31, a storage 32, an operation display 33, and a communicator 34. The user terminal 3 is, for example, an information processing apparatus such as a personal computer, a smartphone, or a tablet terminal.

The communicator 34 is a communication interface for connecting the user terminal 3 to the network N1 by wire or wirelessly, and performing data communication with the server 1 and the display device 2 via the network N1 according to a predetermined communication protocol.

The operation display 33 is a user interface that includes a display such as a liquid crystal display or an organic EL display that displays information such as various web pages, and an operation inputter such as a mouse, a keyboard, or a touch panel that accepts an operation. For example, the operation display 33 displays a screen executed by the Web application.

The storage 32 is a non-volatile storage such as an HDD, an SSD, or a flash memory that stores various types of information. For example, the storage 32 stores a control program such as a browser program. More specifically, the browser program is a control program for causing the controller 31 to execute communication processing with an external device such as the server 1 according to a communication protocol such as the Hypertext Transfer Protocol (HTTP). Furthermore, the browser program may be a dedicated application for executing communication processing with the server 1 according to a predetermined communication protocol.

The controller 31 includes controlled devices such as a CPU, a ROM, and a RAM. The CPU is a processor that executes various types of arithmetic processing. The ROM is a non-volatile storage in which control programs such as a BIOS and an OS for causing the CPU to execute various types of processing are stored in advance. The RAM is a volatile or non-volatile storage that stores various types of information, and is used as a temporary storage memory (work area) for various types of processing executed by the CPU. Furthermore, the controller 31 controls the user terminal 3 by causing the CPU to execute the various control programs stored in advance in the ROM or the storage 12.

More specifically, the controller 31 includes various processing units such as a display processing unit 311, an acceptance processing unit 312, and a transmission processing unit 313. Note that the controller 31 functions as the various processing units by executing the various processing according to the control program. Furthermore, part or all of the processing units included in the controller 31 may be configured as electronic circuits. Note that the control program may be a program for causing a plurality of processors to function as the various processing units.

The display processing unit 311 causes the operation display 33 to display a display screen by the Web application. For example, when the user logs in to the Web application on the user terminal 3, the display processing unit 311 causes the operation display 33 to display various operation screens.

The acceptance processing unit 312 accepts various operations for the Web application from the user. For example, the acceptance processing unit 312 accepts an operation of registering playback target content from the user. When the acceptance processing unit 312 accepts the content registration operation, the registration processing unit 111 of the server 1 registers the content in a playlist.

Furthermore, the acceptance processing unit 312 accepts from the user an operation of selecting access information for accessing the access target data. For example, when the access file A1 (HTML file) including a URL for accessing the access target data d1 is written in the operation folder F1 (see FIG. 3), and the user selects the access file A1 in the operation folder F1, the acceptance processing unit 312 accepts the operation of selecting the access file A1.

When the acceptance processing unit 312 accepts the user's operation of selecting the access file A1, the transmission processing unit 313 transmits an access request to the server 1. Here, the transmission processing unit 313 transmits the access request for the access target data d1 to the server 1 based on the access file A1 (HTML file).

When the server 1 authenticates the access request, the display processing unit 311 causes the operation display 33 to display the operation screen (see FIG. 5) of the playback settings of the content corresponding to the access target data d1. This allows the user to perform various setting operations related to playback of the content corresponding to the access target data d1. That is, the user having the operation privilege of the operation folder F1 can perform the setting operation on the setting information.

As another embodiment, when the operation folder F1 in which the access file A1 is stored and the folder to which the password has been set are the same folder, the transmission processing unit 313 may transmit the access request for the access target data d1 to the server 1.

[Authentication Processing]

Figure 6:
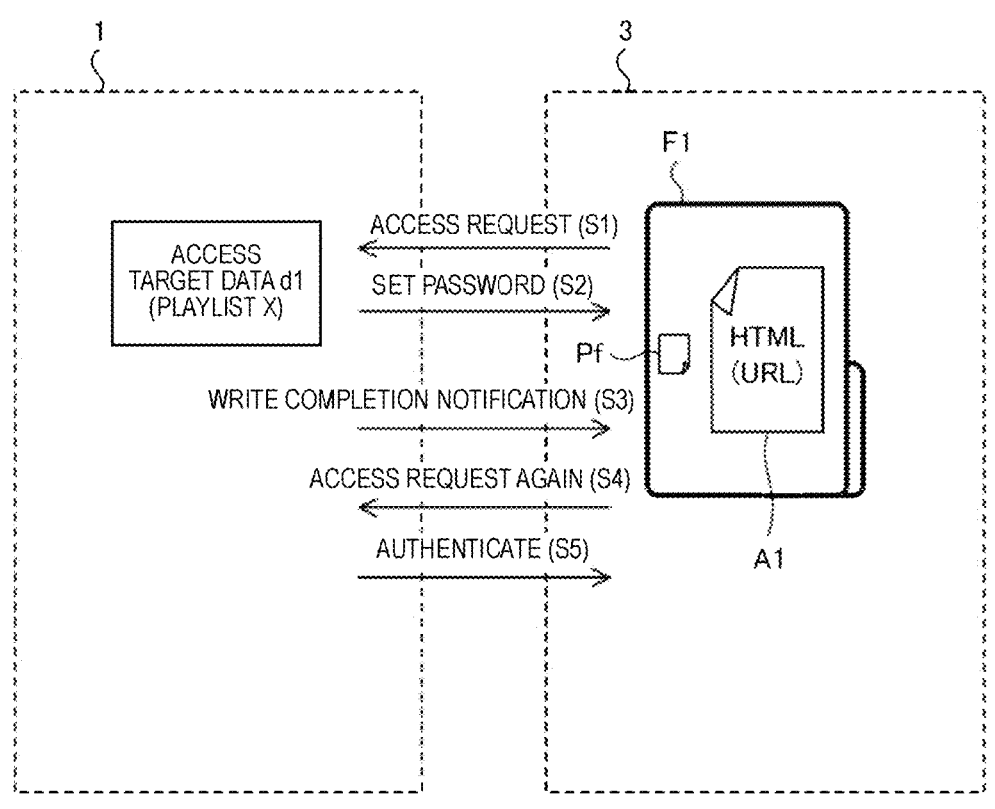
FIG. 6 is a sequence diagram for illustrating an example of a procedure of authentication processing according to the embodiment of the present disclosure.

Hereinafter, an example of a procedure of authentication processing executed by the signage system 10 will be described with reference to FIG. 6.

Note that that the present disclosure can be regarded as disclosure of an authentication method of executing one or a plurality of steps included in the authentication processing. Furthermore, the one or more steps included in the authentication processing described here may be omitted as appropriate. Furthermore, an execution order of each step of the authentication processing may be different as long as the same function and effect are obtained. Furthermore, here, a case where the controller 11 of the server 1 and the controller 31 of the user terminal 3 execute each step of the authentication processing will be described as an example. However, in another embodiment, a plurality of processors may execute each step of the authentication processing in a distributed manner.

Here, the authentication processing will be described in a case where the user having the operation privilege of the operation folder F1 (e.g., a registration operation privilege of content) accesses the access target data d1, and performs a setting operation related to playback settings of the content.

First, in step S1, the controller 31 of the user terminal 3 transmits an access request for the access target data d1 to the server 1. For example, when the user wants to access the access target data d1 on the user terminal 3, the user selects the access file A1 (HTML file) written in the operation folder F1 in advance. The access file A1 includes a URL for accessing the access target data d1. When the user selects the access file A1, the controller 31 transmits the access request to the server 1.

When acquiring the access request from the user terminal 3, the controller 11 of the server 1 sets a password to the operation folder that is the transmission source of the access request in step S2. For example, when the user selects the access file A1 registered in the operation folder F1, the controller 11 sets a password ("pass1") to the operation folder F1. Furthermore, the controller 11 registers in the authentication information D1 the operation folder ID ("F001") and the password ("pass1") of the operation folder F1 associated with each other (see FIG. 2).

Furthermore, the controller 11 generates the password file Pf including the set password ("pass1"), and writes the password file Pf in the operation folder F1. FIG. 6 schematically illustrates a state where the password file Pf is written in the operation folder F1. As described above, when the access file A1 is selected, the controller 11 sets the password (password file Pf) to the operation folder F1 (see FIG. 2) associated with the URL (access information) included in the access file A1.

When processing of writing the password file Pf in the operation folder F1 is completed, the controller 11 transmits a write completion notification to the user terminal 3 in step S3.

When acquiring the write completion notification from the server 1, the controller 31 of the user terminal 3 transmits the access request to the server 1 again in step S4. More specifically, the controller 31 reads the password from the password file Pf written in the operation folder F1, and transmits the password together with the access request to the server 1.

When acquiring the access request again from the user terminal 3, the controller 11 of the server 1 executes the authentication processing in step S5. More specifically, the controller 11 determines whether or not the password included in the access request matches with the password registered in the authentication information D1 (see FIG. 2), and authenticates the access to access target data when determining that both of the passwords match. For example, when the password included in the access request for the access target data d1 matches with the password ("pass1") (see FIG. 2) associated with the operation folder F1, the controller 11 authenticates (permits) the access to the access target data d1.

On the other hand, when the password included in the access request for the access target data d1 does not match with the password ("pass1") associated with the operation folder F1, the controller 11 rejects the access to the access target data d1.

When authenticating the access to the access target data d1, the controller 11 permits the user having the operation privilege of the operation folder F1 to perform the setting operation related to playback settings of content. When the access to the access target data d1 is authenticated, the controller 31 of the user terminal 3 displays the operation screen (see FIG. 5) of the playback settings of the content corresponding to the access target data d1, and accepts the user's setting operation. This allows the user to perform various setting operations related to playback of the content corresponding to the access target data d1 on the operation screen of the user terminal 3.

As described above, the server 1 and the user terminal 3 execute the authentication processing. Furthermore, the server 1 and the user terminal 3 execute the authentication processing every time an access request is acquired from the user terminal 3.

As described above, the signage system 10 is a system that authenticates an access to access target data, and the signage system 10 includes the setting processing unit 112 that, when access information used to access the access target data is selected by a user, sets password information necessary to access the access target data to a predetermined operation folder associated with the access information in advance, the transmission processing unit 313 that transmits an access request including the password information based on the access information, and the authentication processing unit 113 that authenticates the access to the access target data based on the password information included in the access request.

According to the above configuration, for example, when the user selects access information (URL) for accessing the access target data d1, password information necessary to access the access target data d1 is set to the predetermined operation folder F1 (see FIG. 2) associated with the access information in advance, and the access request including the password information is transmitted to the server 1. Furthermore, the server 1 authenticates the access to the access target data d1 based on the password information included in the access request.

Figure 7:
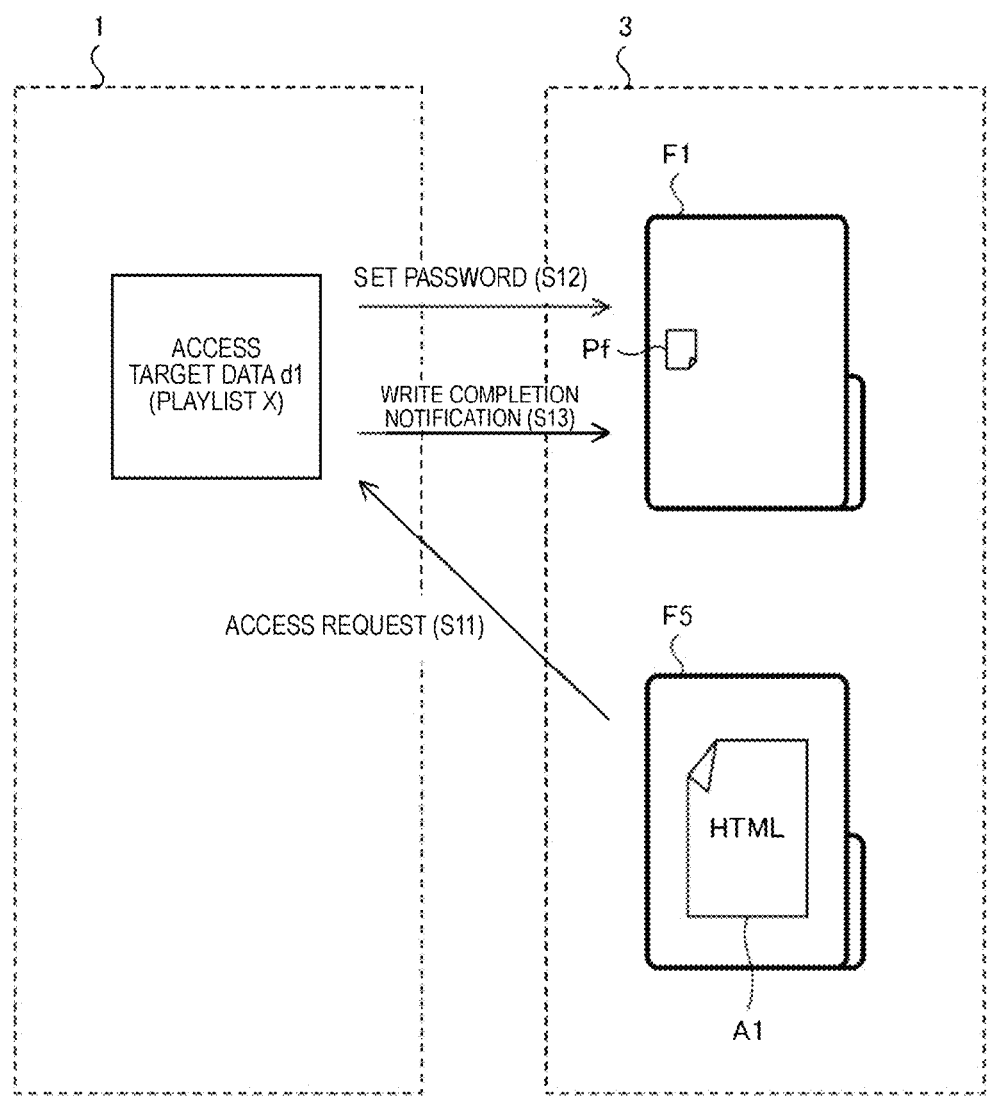
FIG. 7 is a diagram illustrating an example of processing of the server and the user terminal according to the embodiment of the present disclosure.

Consequently, for example, when a third party who does not have the access privilege to the access target data d1 illegally acquires the access information and tries to access the access target data d1 based on the access information, the server 1 does not perform authentication, so that it is possible to prevent the unauthorized access. For example, as illustrated in FIG. 7, when the third party writes (duplicates) in an operation folder F5 for which the third party has the access privilege the access file A1 (URL) written in the operation folder F1, and selects the access file A1 (S11), the controller 11 of the server 1 sets the password ("pass1") and writes the password file Pf to and in the operation folder F1 (see FIG. 2) associated with the URL (access information) included in the access file A1 (S12), and transmits a write completion notification to the user terminal 3 of the operation folder F1. In this case, since the password file Pf is not written in the operation folder F5 that can be operated by the third party, the user terminal 3 of the third party cannot transmit the access request including the password to the server 1, and the processing is interrupted. Consequently, the access to the access target data d1 via the operation folder F5 is rejected, so that it is possible to prevent an unauthorized access to the access target data d1.

Furthermore, according to the configuration of the present embodiment, the access privilege for the access target data d1 does not need to be additionally set to a user who has the access privilege for the operation folder F1, and the user can access the access target data d1, so that it is possible to improve operability of the access to the access target data.

Note that, as another embodiment of the present disclosure, the password set to the operation folder may be a password (one time password) that is issued at regular time intervals and can be used only once. Consequently, it is possible to enhance security of the access to the access target data.

[Supplementary Notes of Disclosure]

An outline of disclosure extracted from the above-described embodiments will be supplementarily noted below. Note that each configuration and each processing function described in the following supplementary notes can be selected and combined as desired.

<Supplementary Note 1>

An authentication system that authenticates an access to access target data includes:

a setting processing circuit that, when access information for accessing the access target data is selected by a user, sets password information necessary to access the access target data to a predetermined operation folder associated with the access information in advance;

a transmission processing circuit that transmits an access request including the password information based on the access information; and an authentication processing circuit that authenticates the access to the access target data based on the password information included in the access request.

<Supplementary Note 2>

In the authentication system described in Supplementary Note 1, the transmission processing circuit transmits the access request when the operation folder in which the access information has been stored and a folder to which the password information has been set are an identical folder.

<Supplementary Note 3>

The authentication system described in Supplementary Note 1 or 2 further includes a registration processing circuit that registers, in a storage, identification information of the operation folder and the password information associated with each other, and the authentication processing circuit authenticates the access to the access target data when the password information included in the access request matches with the password information registered in the storage.

<Supplementary Note 4>

In the authentication system described in any one of Supplementary Notes 1 to 3, the password information is a one time password.

<Supplementary Note 5>

In the authentication system described in any one of Supplementary Notes 1 to 4, the access information includes a URL for accessing the access target data via a network.

<Supplementary Note 6>

In the authentication system described in any one of Supplementary Notes 1 to 5, the access target data is setting information related to playback of content, an operation of registering playback target content in the operation folder is accepted from a predetermined user, and the authentication processing circuit permits the predetermined user having an operation privilege of the operation folder to perform a setting operation on the setting information when the access is authenticated.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An authentication system that authenticates an access to access target data stored in a server in a case that access information stored in a folder of a user terminal is selected by a user, the authentication system comprising:

a first transmission processing circuit of the user terminal that, in a case that the access information is selected by the user, transmits an access request from the user terminal to the server;

a second transmission processing circuit of the user terminal that, in a case that the access request is transmitted from the user terminal to the server, transmits password setting information from the server to the user terminal;

a setting processing circuit of the user terminal that, in a case that the password setting information is transmitted from the server to the user terminal, generates, based on the password setting information, a password file, in which password information necessary to access the access target data is recorded, and stores the password file in a predetermined operation folder associated with the access information in advance;

a third transmission processing circuit of the user terminal that, in a case that the password file is generated and stored, transmits, from the user terminal to the server, a re-access request including the password information recorded in the password file stored in the predetermined operation folder; and an authentication processing circuit of the server that authenticates the access to the access target data based on the password information included in the re-access request.

2. The authentication system according to claim 1, wherein the third transmission processing circuit transmits the re-access request in a case that the folder of the user terminal in which the access information has been stored, and the predetermined operation folder in which the password file has been stored, are identical.

3. The authentication system according to claim 2, wherein the server further comprises a registration processing circuit that registers, in a storage of the server, identification information of the predetermined operation folder, and the password information, as associated with each other, wherein the authentication processing circuit authenticates the access to the access target data in a case that the password information included in the re-access request matches with the password information registered in the storage.

4. The authentication system according to claim 1, wherein the password information is a one-time password.

5. The authentication system according to claim 1, wherein the access information includes a uniform resource locator (URL) for accessing the access target data via a network.

6. The authentication system according to claim 2, wherein:

the access target data is comprises setting information related to playback of content, an operation of registering playback target content in the predetermined operation folder is accepted from a predetermined user having a privilege to operate the predetermined operation folder, and the authentication processing circuit permits the predetermined user to perform a setting operation on the setting information in a case that the access is authenticated.

7. An authentication method for authenticating an access to access target data stored in a server in a case that access information stored in a folder of a user terminal is selected by a user, the authentication method being executed by one or more processors, the authentication method comprising:

in a case that the access information is selected by the user, transmitting an access request from the user terminal to the server;

in a case that the access request is transmitted from the user terminal to the server, transmitting password setting information from the server to the user terminal;

in a case that the password setting information is transmitted from the server to the user terminal, generating, based on the password setting information, a password file, in which password information necessary to access the access target data-te is recorded, and storing the password file in a predetermined operation folder associated with the access information in advance;

in a case that the password file is generated and stored, transmitting, from the user terminal to the server, a re-access request including the password information recorded in the password file stored in the predetermined operation folder; and authenticating the access to the access target data based on the password information included in the re-access request.

8. A non-transitory computer-readable recording medium having recorded thereon one or more instructions for causing an electronic device to authenticate an access to access target data stored in a server in a case that access information stored in a folder of a user terminal is selected by a user, the one or more instructions, when executed by one or more processors of the electronic device, causing the one or more processors to execute:

in a case that the access information is selected by the user, transmitting an access request from the user terminal to the server;

in a case that the access request is transmitted from the user terminal to the server, transmitting password setting information from the server to the user terminal;

in a case that the password setting information is transmitted from the server to the user terminal, generating, based on the password setting information, a password file, in which password information necessary to access the access target data is recorded, and storing the password file in a predetermined operation folder associated with the access information in advance;

in a case that the password file is generated and stored, transmitting, from the user terminal to the server, a re-access request including the password information recorded in the password file stored in the predetermined operation folder; and authenticating the access to the access target data based on the password information included in the re-access request.

\*    \*    \*    \*    \*